US 9,149,895 B2

(12) United States Patent
Rudat et al.

(10) Patent No.: US 9,149,895 B2
(45) Date of Patent: Oct. 6, 2015

(54) NON-PLAIN CARBON STEEL HEADER FOR A HEAT EXCHANGER

(75) Inventors: Rodney R. Rudat, Jackson, TN (US); Joseph Tapley, Medon, TN (US); Jay S. Korth, Jackson, TN (US)

(73) Assignee: Wabtec Holding Corp., Wilmerding, PA (US)

( * ) Notice: Subject to any disclaimer, the term of this patent is extended or adjusted under 35 U.S.C. 154(b) by 1080 days.

(21) Appl. No.: 12/740,066

(22) PCT Filed: Oct. 30, 2008

(86) PCT No.: PCT/US2008/081764
§ 371 (c)(1),
(2), (4) Date: Aug. 23, 2010

(87) PCT Pub. No.: WO2009/058986
PCT Pub. Date: May 7, 2009

(65) Prior Publication Data
US 2010/0307144 A1    Dec. 9, 2010

Related U.S. Application Data

(60) Provisional application No. 60/983,729, filed on Oct. 30, 2007.

(51) Int. Cl.
*F28F 9/02* (2006.01)
*B23P 15/26* (2006.01)
(Continued)

(52) U.S. Cl.
CPC ............... *B23P 15/26* (2013.01); *B21D 39/06* (2013.01); *B21D 53/06* (2013.01); *B21D 53/08* (2013.01); *F02B 29/0431* (2013.01); *F28F 9/16* (2013.01); *F28F 21/08* (2013.01); *F28F 2265/26* (2013.01); *Y02T 10/146* (2013.01); *Y10T 29/49375* (2015.01)

(58) Field of Classification Search
CPC ............... F28F 9/02; F28F 9/16; F28F 21/08; F28F 2265/26; B21D 39/06; B21D 53/08; B23P 15/26; F02B 29/0431; Y10T 29/49375; Y02T 10/146
USPC ..................... 165/173, 175, 153; 29/890.038, 29/890.043
See application file for complete search history.

(56) References Cited

U.S. PATENT DOCUMENTS 2,735,698 A * 2/1956 Brinen ................ 285/148.11
2,743,342 A * 4/1956 Bettis et al. ................ 219/123
(Continued)

FOREIGN PATENT DOCUMENTS

CA    2410323 A1    2/2004
DE    3724675 A1    2/1989
(Continued)

*Primary Examiner* — Tho V Duong
(74) *Attorney, Agent, or Firm* — The Webb Law Firm

(57) ABSTRACT

A heat exchanger, such as an air-to-air after-cooler assembly, having reduced and/or eliminated leakage at the tube/header joint is provided. The assembly comprises a series of tubular members formed from a first metal, each of the tubular members including an end portion and a header formed from a second metal, wherein the first metal and the second metal have similar coefficients of thermal expansions. The header includes a plurality of openings extending therethrough and each of the end portions of the tubular members is mechanically secured within corresponding openings within the header to form an after-cooler assembly. A method for forming the air-to-air after-cooler assembly is also provided.

22 Claims, 4 Drawing Sheets

(51) Int. Cl.
  *B21D 39/06* (2006.01)
  *B21D 53/06* (2006.01)
  *B21D 53/08* (2006.01)
  *F02B 29/04* (2006.01)
  *F28F 9/16* (2006.01)
  *F28F 21/08* (2006.01)
  *F28F 13/00* (2006.01)

(56) References Cited

U.S. PATENT DOCUMENTS

| | | | |
|---|---|---|---|
| 3,857,151 A | | 12/1974 | Young et al. |
| 3,939,908 A | | 2/1976 | Chartet |
| 5,178,211 A | * | 1/1993 | Bauer et al. ............ 165/153 |
| 5,189,900 A | | 3/1993 | Colvin et al. |
| 5,205,354 A | * | 4/1993 | Lesage ................ 165/173 |
| 5,309,637 A | | 5/1994 | Moriarty |
| 5,324,084 A | | 6/1994 | Bodas et al. |
| 5,378,294 A | | 1/1995 | Rissanen |
| 5,407,004 A | * | 4/1995 | DeRisi et al. ........... 165/153 |
| 5,429,794 A | * | 7/1995 | Kamf et al. ............ 420/477 |
| 6,000,461 A | | 12/1999 | Ross et al. |
| 6,264,764 B1 | | 7/2001 | Kamf et al. |
| 6,997,371 B2 | | 2/2006 | Shabtay |
| 7,032,808 B2 | | 4/2006 | Shabtay |
| 8,839,846 B2 | * | 9/2014 | Smith et al. ........... 165/173 |
| 2005/0121184 A1 | * | 6/2005 | Smith et al. ........... 165/173 |
| 2005/0283967 A1 | | 12/2005 | Panthofer |
| 2006/0249559 A1 | | 11/2006 | Panthofer |
| 2006/0254761 A1 | | 11/2006 | Wantabe et al. |
| 2007/0193732 A1 | | 8/2007 | Oofune et al. |
| 2007/0204614 A1 | | 9/2007 | Kolb |

FOREIGN PATENT DOCUMENTS

| | | |
|---|---|---|
| DE | 202006011660 U1 | 10/2006 |
| DE | 102006021763 A1 | 5/2007 |
| GB | 849640 | 9/1960 |
| GB | 2079204 A | 1/1982 |

* cited by examiner

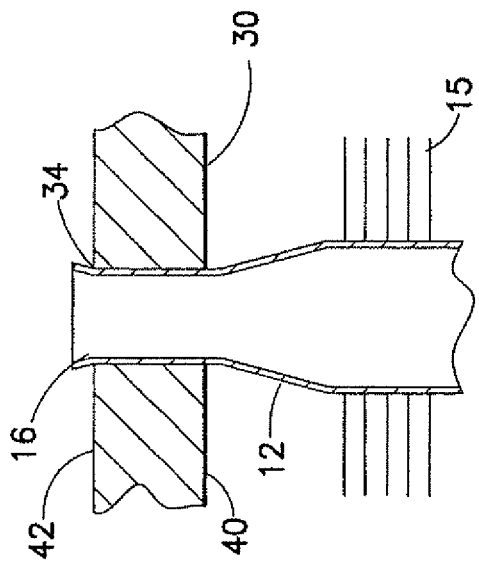
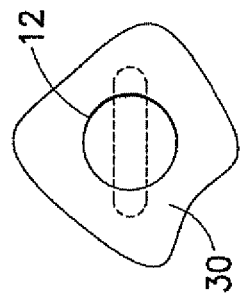
FIG.4A
FIG.4B
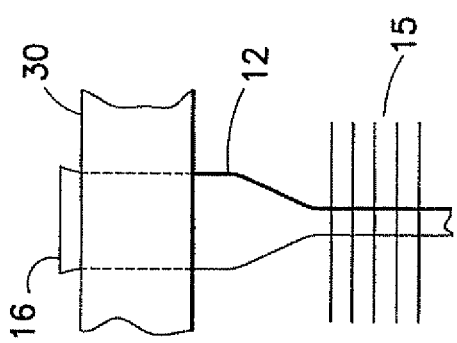
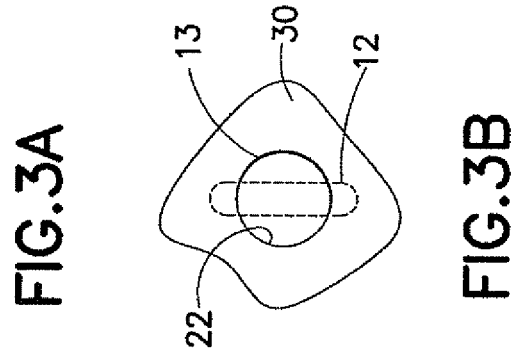
FIG.3A
FIG.3B

NON-PLAIN CARBON STEEL HEADER FOR A HEAT EXCHANGER

BACKGROUND OF THE INVENTION

1. Field of the Invention

This application relates in general to a heat exchanger and, more particularly, to a header for mechanically joining with a series of tubes in the formation of an air-to-air after-cooler or an exhaust gas recirculation cooler, wherein leakage at the tube/header joint is reduced.

2. Description of Related Art

Current methods for securing a header to a series of tubes in high temperature air-to-air after-cooler (ATAAC) applications include mechanically expanding or rolling the tube ends into apertures formed within a header. Specifically, a tube, being composed of a brass or copper is mechanically expanded or rolled into a header being composed of a plain carbon steel. U.S. Pat. No. 3,857,151 to Young et al. shows a process for joining a series of tubes to a header wherein tubes, which are flat or oval, have end portions which are transformed into a generally round shape such that they can be inserted into apertures within a header. The tube ends are then expanded by inserting an expanding tool into the end of the tube to mechanically expand this tube end into contact with the aperture to mechanically join the tubes to the header.

Due to the differing metals used for the tubes (i.e., brass or copper alloys) and the headers (i.e., carbon steel), these materials have different thermal expansion coefficients. When exposed to high temperatures, during use of the heat exchanger, the different thermal expansion coefficients of the two materials cause a significant amount of stress to be applied to the tube material. Specifically, the brass or copper alloy tube has a tendency to grow diametrically about 1.75 times what the carbon steel header hole wants to expand. This difference in thermal growth causes the brass or copper alloy to be placed under compression by such an amount that it can yield (i.e., remain in a compressed state after release of pressure thereto) so that when the two metals return to ambient temperature, the tube will shrink to a smaller diameter than before and a leak path develops at the tube/header interface. The mechanically rolled joint now leaks.

Current solutions to the problem are to allow the leak to occur until such a point where the unit would need to be reworked or replaced due to the leak becoming too large. This problem starts small, but will increase with time and the number of cycles that the ATAAC goes through. Also, since inlet temperatures of ATAAC's are generally increasing due to new engine Tiers (engine classification on levels based on emission standards), the problem of leakage due to differing thermal coefficients of expansion will continue to increase. Another type of heat exchanger used in high temperature applications is an exhaust gas recirculation cooler (EGR). The leakage problems discussed above would also be present in EGR cooler systems.

One solution for plugging these leaks is the application of a bonding agent or metal filler material, such as a brazing alloy, to fill in the extra gap. A preferred technique for attaching tubes to a header is a technique known as a CUPRO-BRAZE™ technique. CUPROBRAZE™ is a manufacturing process that is used to braze copper and brass at temperatures that are generally lower than normal brazing operations, but do not exceed the softening temperatures of the components being joined. This process involves depositing a braze paste on the tubes, which are then assembled and heated to a suitable brazing temperature. The tubes used in the CUPRO-BRAZE™ process are based on the copper zinc iron (CuZnFe) system; particularly an alloy containing 14-31% by weight zinc, 0.7-1.5% by weight iron, 0.001-0.050% by weight phosphorous and 0-0.09% by weight arsenic, the balance being copper and incidental impurities. The paste used as the brazing compound is known as OKC 600, as discussed in U.S. Pat. No. 5,378,294 to Rissanen and U.S. Pat. Nos. 5,429,794 and 6,264,764 to Kamf et al. This compound contains binders and a metal braze alloy based on the CuSnP system, for example, about 75% copper, about 15% tin, about 5% nickel and about 5% phosphorus. Other compounds and methods are being developed for use with the CUPRO-BRAZE™ technique. These compounds are the subject of U.S. Pat. Nos. 7,032,808 and 6,997,371 to Shabtay and U.S. Patent Application Publication Nos. 2005/0283967 and 2006/0249559 to Panthofer. In a typical. CUPROBAZE™ process, a thin gauge brass header is used. Preferably, the header is less than approximately ¼" thick to enable the oval holes to be punched therethrough and/or extruded so as to produce a collar. The tubes are then inserted through these collared holes and brazed into this header with the brazing paste. Other alloys currently in use to bond brass and copper to plain carbon steel generally have some kind of high level of silver content. Consequently, their use becomes price prohibitive. Also, the application of these materials would add labor costs and additional steps to the manufacturing process. Furthermore, these filler materials can also crack in high stress applications causing leaks to occur that are larger than those seen in the mechanical bonded joints.

For these reasons, it is desirable to mechanically join the tube to the header joint without the use of any other bonding or filling agent, such as brazing alloy, solder, adhesive and the like. Accordingly, there is a need in the art for a mechanical joining process which reduces or eliminates the aforementioned gaps between the tube-to-header joint caused during high heat exposure of the ATAAC or EGR exchanger during use.

SUMMARY OF THE INVENTION

The present invention is directed to a heat exchanger assembly, preferably an air-to-air after-cooler assembly or an exhaust gas recirculation cooler and a process of mechanically joining a header to a series of tubular members for a heat exchanger utilizing a header material having thermal expansion properties similar to the material used for the series of tubes, resulting in the reduction and/or elimination of leakage at the tube/header joint that can occur as a result of high temperature exposure of the heat exchanger assembly. Further, the present invention provides a heat exchanger assembly and a process of forming the heat exchanger assembly wherein the reduction and/or elimination of leakage at the tube/header joint of the mechanically joined members is achieved in a cost-effective manner without the use of a bonding or filling agent.

According to one aspect, the present invention is directed to a heat exchanger, such as an air-to-air after-cooler assembly or an exhaust gas recirculation cooler, comprising a series of tubular members formed from a first metal, each of the tubular members including an end portion and a header formed from a second metal, wherein the first metal and the second metal have similar coefficients of thermal expansions. According to one embodiment, the first metal used to form the tubes is typically a brass or copper alloy, and the second metal used to form the header is a stainless steel material. The header includes a plurality of openings extending therethrough and each of the end portions of the tubular members is mechanically secured within corresponding openings within the header to form the after-cooler assembly.

According to another aspect, the present invention is also directed to a method of joining a header to a series of tubular members for a heat exchanger, such as an air-to-air after-cooler assembly or an exhaust gas recirculation cooler, comprising providing a series of generally flat or oval tubular members formed from a first metal and transforming at least one end portion of each of the tubular members into a generally round shape. A header formed from a second metal is provided in which the header includes a plurality of openings extending therethrough, wherein the first metal and the second metal have similar coefficients of thermal expansions. Each of the rounded end portions of the tubular members are inserted within a corresponding opening within the header to form a after-cooler assembly. The end portions of the tubular members are mechanically expanded to bring these end portions into contact with and to join the end portions of the tubular members within the openings of the header.

These and other features and characteristics of the present invention, as well as the methods of operation and functions of the related elements of structures, and the combination of parts and economies of manufacture will become more apparent upon consideration of the following description with reference to the accompanying drawings, all of which form a part of this specification, wherein like reference numerals designate corresponding parts in the various figures.

BRIEF DESCRIPTION OF THE DRAWINGS

FIG. 3A is a side view of the tube-to-header joint;

FIG. 3B is a top view of the end of the tube end of the tube-to-header joint of FIG. 3A;

FIG. 4A is a cross-sectional side view of the tube-to-header joint;

FIG. 4B is a top view of the end of the tube-to-header joint of FIG. 4A; and

DETAILED DESCRIPTION OF THE INVENTION

Figure 1:
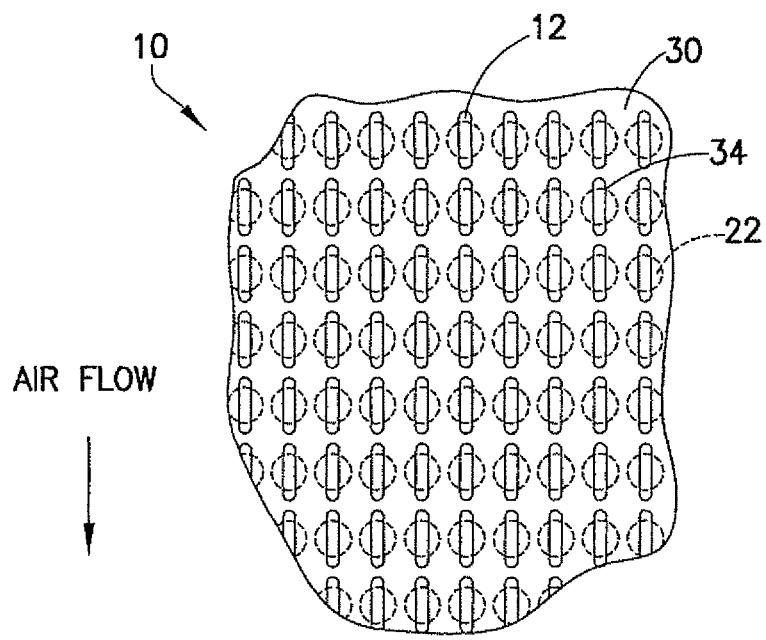
FIG. 1 is a partial end view of a tube/header assembly for an air-to-air after-cooler wherein the series of tubes is laid out according to a first arrangement.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
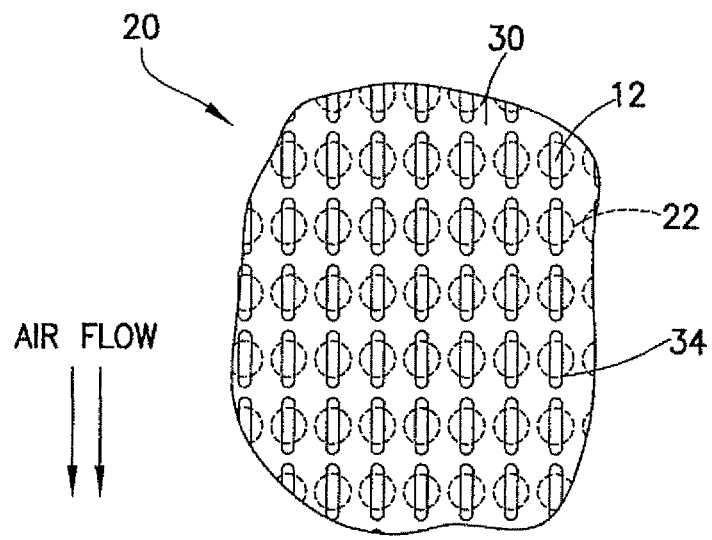
FIG. 2 is a partial end view of a tube/header assembly for an air-to-air after-cooler wherein the series of tubes is laid out according to a second arrangement.

FIGS. 1-2 show partial end views of a tube/header assembly, generally indicated as 10, 20, for a heat exchanger, such as an air-to-air after-cooler assembly, wherein the series of tubes is laid out according to various arrangements. The process of the present invention can be used with any type of fin and tube arrangement. These arrangements include, but are not limited to, staggered, parallel, canted, plate fin, Serpentine, CT, and the like. The process of the present invention can also be used with other types of heat exchangers, such as exhaust gas recirculation coolers. According to one arrangement, generally indicated as 10 in FIG. 1, the tubular members 12 are positioned perpendicular to each other and inserted into openings 22 in a header 30. According to an alternative arrangement, generally indicated as 20 in FIG. 2, the tubular members 12 are positioned in a staggered array and inserted into openings 22 in the header 30. The staggered array arrangement of FIG. 2 provides less tube side pressure drop as the core includes more tubes in the same volume of core as the core arrangement of FIG. 1, given that the web or minimum distance between the header holes remains the same.

Figure 5A:
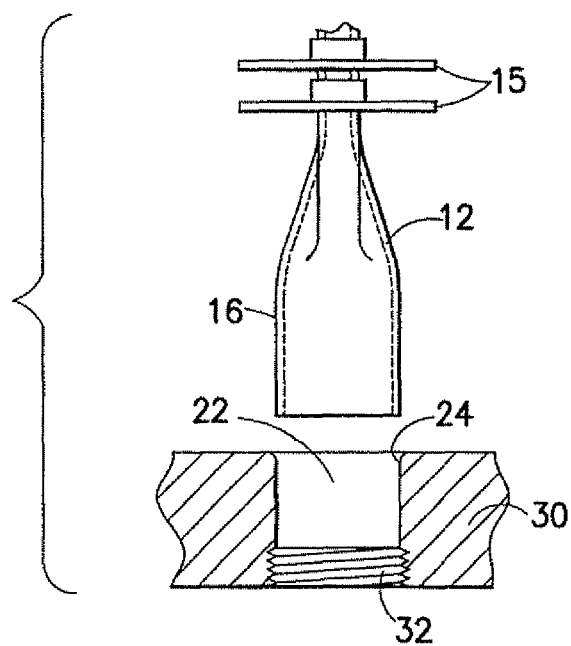
FIGS. 5A-5D are sequential steps for mechanically joining a tube to a header.
Figure 5B:
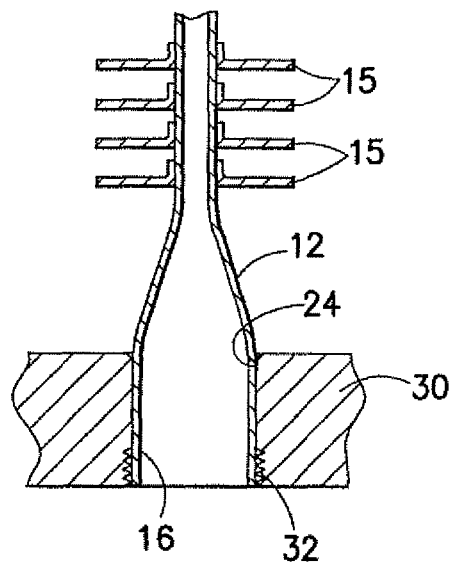
Figure 5C:
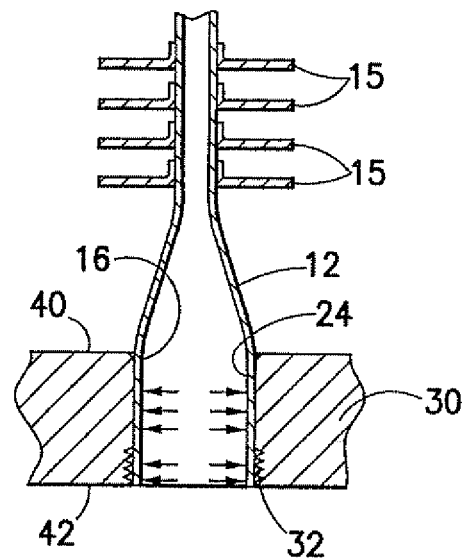
Figure 5D:
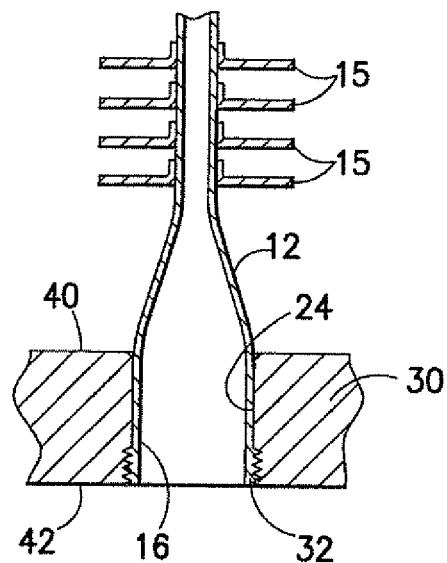

The tubular members 12 are attached to the header 30 by a mechanical attachment wherein the individual tubular members 12 are mechanically expanded, rolled or swaged into the openings 22 of the header 30 having similar hole geometry to provide the tube-to-header connection. This expansion technique for constructing a heat exchanger is discussed in detail in U.S. Pat. No. 3,857,151 to Young et al. and shown in FIGS. 5A-5D. As shown in FIGS. 5A-5B, a tube 16, which has been preliminarily cold-worked to form a rounded end and is positioned within a similarly shaped hole 22 having an inner surface 24 located in a header 30. The tube end 16 is then internally expanded. FIG. 5C shows the lines of force on the inside of the tube due to an expanding tool which, is rotatable in the rounded end 16 of the tubular members 12 as it is pressed into the rounded section. As shown in FIG. 5D, the end of the tube 16 is caused to literally flow into tight contact with the inner surface 24 of the hole 22 to mechanically join the tubular members 12 to the header 30. A series of serrations or threads 32 can be formed along the inner surface 24 of the hole 22 to aid in the mechanical integration of the tube end 16 within the hole 22.

Now turning to the invention at hand, it has been found that the leakage at the tube/header joint is often encountered in mechanical joining processes such as those discussed above in the manufacture of high temperature air-to-air after-cooler applications. In order to reduce this leakage, the present invention utilizes a header 30 formed from a material having thermal expansion properties similar to the material used for the series of tubular members 12. It has been found that this allows one to reduce and/or eliminate leakage at a tube/header joint 32 of mechanically joined members in a cost-effective manner.

Accordingly, the present invention is directed to a heat exchanger, such as an air-to-air after-cooler assembly 10, 20 comprising a series of tubular members 12 formed from a first metal, each of the tubular members 12 including an end portion and a header 30 formed from a second metal, wherein the first metal and the second metal have similar coefficients of thermal expansions. The header 30 includes a plurality of openings 22 extending therethrough and each of the end portions of the tubular members 12 is mechanically secured within corresponding openings within the header 30 to form the after-cooler assembly 10, 20.

The present invention is also directed to a method of joining the header 30 to the series of tubular members 12 for an air-to-air after-cooler assembly 10, 20 wherein a series of generally flat or oval tubular members 12 formed from a first metal is provided. The flat or oval portions of the tubular members 12 extend through the main core of the assembly. According to one embodiment, the flat or oval portions of the tubular members 12 can extend through plate fins 15 of the heat exchanger. Other core arrangements suitable for use in the invention include fins having a Serpentine, lanced/offset, square wave, or any other commonly used design. As shown in FIGS. 3A-3B, 4A-4B, and 5A-5D at least one end portion 16 of each of the tubular members 12 is transformed into a generally round shape. A header 30 formed from a second metal is provided in which the header includes a plurality of openings 22 extending therethrough, wherein the first metal and the second metal have similar coefficients of thermal expansions. Each of the rounded end portions 16 of the tubular members 12 is inserted within a corresponding opening 22 within the header 30 to form the after-cooler assembly 10, 20. As shown in FIGS. 4A-4B, and 5C-5D, the rounded end portions of the tubular members 12 are mechanically expanded to bring these end portions 16 into contact with, and to join the end portions of the tubular member 12 within the openings 22 of the header.

The present invention seeks to use a material formed of a second metal material for the header 30 wherein this second metal material has significantly closer thermal expansion properties to the first metal material of the tubular members 12. The header 30 is generally a flat or planar sheet of material having a thickness of at least ¼", typically a thickness of between ¼"-1". The header 30 of the present invention is thick enough to support the mechanical bond between the circular end of the tubular members 12 and the header 30. This thicker header 30 reduces the deformation of the header 30 when the tube-to-header assembly is in use. Moreover, the added strength provided by the thicker header 30 allows longer tubes to be used than in the prior art type tube-to-header assemblies, thereby increasing the heat exchange capability of, for example, a heat exchanger. Additionally, as shown in FIGS. 4A and 5C-5D, the header 30 has a thickness that is thick enough to support the tubular members 12, such that the ends 16 of the tubular members 12 enter through a first side 40 of the header, extend through the openings 20, and are flush with a second side 42 of the header 30. The header 30 generally does not have collars extending from, or punched through, thin gauge (i.e., less than ¼") headers such as typically used in the CUPROBRAZE™ process. The preferred header material comprises a stainless steel, but is not necessarily limited to any particular grade as any one of the varieties of stainless steel that gives a significant increase in thermal expansion as compared to plain carbon steel could be used. The second metal material for forming the header can also be a brass or copper alloy material, such as a CuZnFe alloy. A significant increase can be defined as a reduction in the difference between thermal expansions of the brass tubular members 12 and the header 30 by at least 25%. Examples of a stainless steel that can be used is stainless steel 304 or 304L. A larger reduction in the difference of thermal expansion rates should equate to a more solid joint 34 and reduction in leaks. With higher temperatures, a closer approach between the tubular members 12 and header 30 thermal expansion rates will be required and header material choice will need to be altered to achieve this. Header material choice will also be determined by other factors such as the desire to use the stainless steel material for its welding properties.

The first metal material of the tubular members 12 typically comprises a brass or copper alloy material and/or a CUPROBRAZE™ (CuZnFe) brass material, as discussed in detail above. It should be noted that a CuZnFe alloy is much harder than the tube materials previously used and thus requires special processing and forming.

In particular, prior tube materials, such as red brass, typically had a Vickers hardness of 80-95 in its raw form. On the other hand, the Vickers hardness for the CuZnFe alloy is approximately 130 in its raw form. Both materials are made on a tube mill by forming a flat strip into the oval shape and then using high frequency induction coils to weld the edges of the strip together. This welding process causes a weld bead to form on the inside and outside of the main tube wall. The external weld bead is typically scarffed or "shaved" down on the tube mill with a tool so that the exterior is smooth, however, the internal weld bead remains. Due to this very hard CuZnFe alloy, typical rolling tools could not smash the weld bead out when rolling the tube into the header and so, to get a proper joint, that portion of the weld bead needs to be removed so that the quality of the joint is improved. An internal sizing tool or internal transforming tool can be inserted into the tube to shape it into a mostly round condition and also smash down or scarf out the internal portion of the weld bead in the area where the tube is rolled into the header. A final external sizing tool or external transforming tool can be used to aid in providing the final round shape. After these processes, the tube is ready for insertion into the header and then ready to be mechanically bonded to the header.

Referring back to the present invention, one embodiment utilizes 304 stainless steel for the header 30 material and CUPROBRAZE™ brass for the tubular members 12. The coefficients of thermal expansion for the material are as follows:

Tube: CUPROBRAZE™ brass SM2385, CTE 1.05 E-5 in/in/F
Header (current product): carbon steel, CTE 6.5 E-6 in/in/F
Header (invention): 304 stainless steel, CTE 9.56 E-6 in/in/F The original difference between the thermal expansion coefficients of the header and tube was 4.0 E-6 in/in/F. The new difference utilizing 304 stainless steel is 0.94 E-6 in/in/F, a reduction of 3.06 E-6 in/in/F. This equates to a reduction in the difference of 76.5%. Finite element analysis was performed to determine the effect of temperature change on a rolled tube/joint single hole of a header using the materials of the prior art and the present invention as follows:

Example 1

A finite element analysis was performed on a rolled tube joint-single hole of a carbon steel header material, having a coefficient of thermal expansion of 6.5E-6 in/in/F, with a CUPROBRAZE™ brass tube having a coefficient of thermal expansion of 1.05E-5 in/in/F.

Example 2

A finite element analysis was performed on a rolled tube joint-single hole of a header material formed of a 304 stainless steel having a coefficient of thermal expansion of 9.56E-6 in/in/F with a CUPROBRAZE™ brass tube having a coefficient of thermal expansion of 1.05E-5 in/in/F.

An evaluation of the effect of temperature change on the rolled tube/header joint on Examples 1 and 2 was performed. Each of Examples 1 and 2 was exposed to an operating temperature of 615° F. to review the change in stresses to the brass (CUPROBRAZE™) tube material as a result of the different header materials. It was found that upon exposure of the assembly of Example 1 at an elevated temperature of 615° F., the stresses imparted upon the brass tube by the plain carbon steel header equaled 45.7 ksi, which is beyond the yield point of the brass material. By changing the header material to 304 stainless steel, as in Example 2, which has a closer coefficient of thermal expansion with that of the brass tube, the stress level was reduced to 8.9 ksi. This amounts to a stress reduction of 80%, which is significantly below the yield strength of the brass material. Accordingly, an ATAAC assembly utilizing the materials of Example 2 would be adapted to withstand the typically high operation temperatures during use without the formation of gaps at the tube/header joint which ultimately results in unwanted leakage at the joint.

Additionally, initial analysis was performed on the preferred embodiment wherein a small prototype was also produced utilizing a standard header and a stainless steel header. After a thermal dwell at 500° F. for 2 hours, the standard plain carbon steel header showed evidence of leaks when a stream of compressed air was "shot" on the backside of the header. The stainless steel header did not show any evidence of leaks.

An additional advantage of the present invention is that the stainless steel header and/or copper/brass tubes provides corrosion protection for the exchanger. This corrosion protection would be desirable even in systems where high temperatures are not a concern such as radiators or oil coolers. Corrosion of a plain carbon steel header can be problematic in these systems. Corrosion can also be a problem in exhaust gas recirculation coolers where exhaust gases containing corrosive properties are often encountered. A highly salty environment such as oil platforms or coastlines along oceans would be another situation where the stainless steel header would provide corrosion protection in air-to-air after-cooler arrangements.

Although the invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the spirit and scope of the invention. For example, it is to be understood that the present invention contemplates that, to the extent possible, one or more features of any embodiment can be combined with one or more features of any other embodiment.

The invention claimed is:

1. A heat exchanger comprising:
   a) a series of tubular members formed from a first metal, each of said tubular members including an end portion; and
   b) a header formed from a second metal, wherein said first metal and said second metal are different from one another and have a difference of thermal expansion coefficients of approximately 0.94 E-6 in/in/F or less, said header including a plurality of openings extending therethrough and wherein each of said end portions of said tubular members is mechanically expanded, rolled, or swaged into a corresponding opening of the header to bring the end portions of the tubular members into contact with and to secure the end portions of each of the tubular members within their corresponding openings within said header to form tubular member/header joints, which are free from a bonding or filling agent, to form the heat exchanger.

2. The exchanger of claim 1, wherein said first metal comprises a brass or copper alloy.

3. The exchanger of claim 2, wherein said first metal comprises a CuZnFe alloy.

4. The exchanger of claim 1, wherein said second metal comprises a stainless steel material.

5. The exchanger of claim 4, wherein said stainless steel metal comprises a 304 stainless steel.

6. The exchanger of claim 1, wherein the exchanger comprises an air-to-air after-cooler assembly.

7. The exchanger of claim 1, wherein the exchanger comprises an exhaust gas recirculation cooler.

8. An air-to-air after-cooler assembly comprising:
   a) a series of tubular members formed from a first metal comprising a brass alloy or copper alloy, each of said tubular members including an end portion; and
   b) a header formed from a second metal comprising a stainless steel, wherein said first metal and said second metal have a difference of thermal expansion coefficients of approximately 0.94 E-6 in/in/F or less, said header including a plurality of openings extending therethrough and wherein each of said end portions of said tubular members is mechanically expanded, rolled, or swaged into a corresponding opening of the header to bring the end portions of the tubular members into contact with and to secure the end portions of each of the tubular members within their corresponding openings within said header to form tube/header joints, which are free from a bonding or filling agent, to form the heat exchanger.

9. The assembly of claim 8, wherein the brass alloy or copper alloy comprises a CuZnFe alloy.

10. The assembly of claim 8, wherein the stainless steel comprises a 304 stainless steel.

11. An exhaust gas recirculation cooler comprising:
   a) a series of tubular members formed from a first metal comprising a brass alloy or copper alloy, each of said tubular members including an end portion; and
   b) a header formed from a second metal comprising a stainless steel, wherein said first metal and said second metal have a difference of thermal expansion coefficients of approximately 0.94 E-6 in/in/F or less, said header including a plurality of openings extending therethrough and wherein each of said end portions of said tubular members is mechanically expanded, rolled, or swaged into a corresponding opening of the header to bring the end portions of the tubular members into contact with and to secure the end portions of each of the tubular members within their corresponding openings within said header to form tube/header joints, which are free from a bonding or filling agent, to form the heat exchanger.

12. The cooler of claim 11, wherein the brass alloy or copper alloy comprises a CuZnFe alloy.

13. The cooler of claim 11, wherein the stainless steel comprises a 304 stainless steel.

14. The heat exchanger of claim 1, wherein the first metal comprises a CuZnFe alloy having a coefficient of thermal expansion of approximately 1.05 E-5 in/in/F and the second metal comprises 304 stainless steel having a coefficient of thermal expansion of approximately 9.56 E-6 in/in/F.

15. The assembly of claim 8, wherein the first metal has a coefficient of thermal expansion of approximately 1.05 E-5 in/in/F and the second metal has a coefficient of thermal expansion of approximately 9.56 E-6 in/in/F.

16. The cooler of claim 11, wherein the first metal has a coefficient of thermal expansion of approximately 1.05 E-5 in/in/F and the second metal has a coefficient of thermal expansion of approximately 9.56 E-6 in/in/F.

17. The heat exchanger of claim 1, wherein the heat exchanger is capable of withstanding operating temperatures in excess of 500° F. without a formation of gaps at the tubular member/header joints, wherein the gaps would result in leakage at the joints.

18. The heat exchanger of claim 17, wherein the heat exchanger is capable of withstanding operating temperatures of 61.5° F.

19. The assembly of claim 17, wherein the assembly is capable of withstanding operating temperatures in excess of 500° F. without a formation of gaps at the tubular member/header joints, wherein the gaps would result in leakage at the joints.

20. The assembly of claim 19, wherein the assembly is capable of withstanding operating temperatures of 615° F.

21. The cooler of claim 11, wherein the cooler is capable of withstanding operating temperatures in excess of 500° F. without a formation of gaps at the tubular member/header joints, wherein the gaps would result in leakage at the joints.

22. The cooler of claim 21, wherein the cooler is capable of withstanding operating temperatures of 615° F.

* * * * *

UNITED STATES PATENT AND TRADEMARK OFFICE
CERTIFICATE OF CORRECTION

| | | |
|---|---|---|
| PATENT NO. | : 9,149,895 B2 | Page 1 of 1 |
| APPLICATION NO. | : 12/740066 | |
| DATED | : October 6, 2015 | |
| INVENTOR(S) | : Rodney R. Rudat et al. | |

It is certified that error appears in the above-identified patent and that said Letters Patent is hereby corrected as shown below:

In the claims

Column 8, Line 67, Claim 18, delete "61.5°" and insert -- 615° --

Column 9, Line 1, Claim 19, delete "The assembly of claim 17," and insert -- The assembly of claim 8, --

Signed and Sealed this
Third Day of May, 2016

Michelle K. Lee
*Director of the United States Patent and Trademark Office*